Dec. 25, 1962 J. J. TRIER 3,069,821
JOURNAL CONSTRUCTION FOR RESILIENT SURFACED
ROLLERS IN INK OR WATER MOTIONS
Filed June 23, 1960 2 Sheets-Sheet 2

INVENTOR
BY
ATTORNEYS

United States Patent Office 3,069,821
Patented Dec. 25, 1962

3,069,821
JOURNAL CONSTRUCTION FOR RESILIENT SURFACED ROLLERS IN INK OR WATER MOTIONS
James J. Trier, Elmsford, N.Y., assignor to R. Hoe & Co., Inc., New York, N.Y., a corporation of New York
Filed June 23, 1960, Ser. No. 38,272
2 Claims. (Cl. 51—274)

This invention relates to resilient surfaced rollers such as used in the ink and water motions of printing machines and more particularly to journal construction thereof and arrangement of the journal construction for grinding of the roller for resurfacing the same.

Resilient surfaced rollers as used in printing machine ink motions and water motions periodically require resurfacing by grinding the rubber or other resilient covering, which entails the removal of the rollers from the machine and placement thereof in the grinding machine, with consequent wear upon the journal which then becomes undersized and no longer fits the bearings in a truly concentric manner. The mounting of the roller in the grinding machine and protection of the journal also presents difficulties.

It is an object of the present invention to provide a roller having a tapered journal together with a protecting fitting for mounting the same on the grinding machine to enable true concentric grinding without wear of the journal or bearing.

A further object is to provide a roller obtaining improved concentricity.

With these and other objects which will appear in the following full description in mind, the invention consists in the combinations and arrangements of parts and details of construction which will now first be fully described with reference to the accompanying drawing, and then be pointed out particularly in the appended claims.

Figure 1:
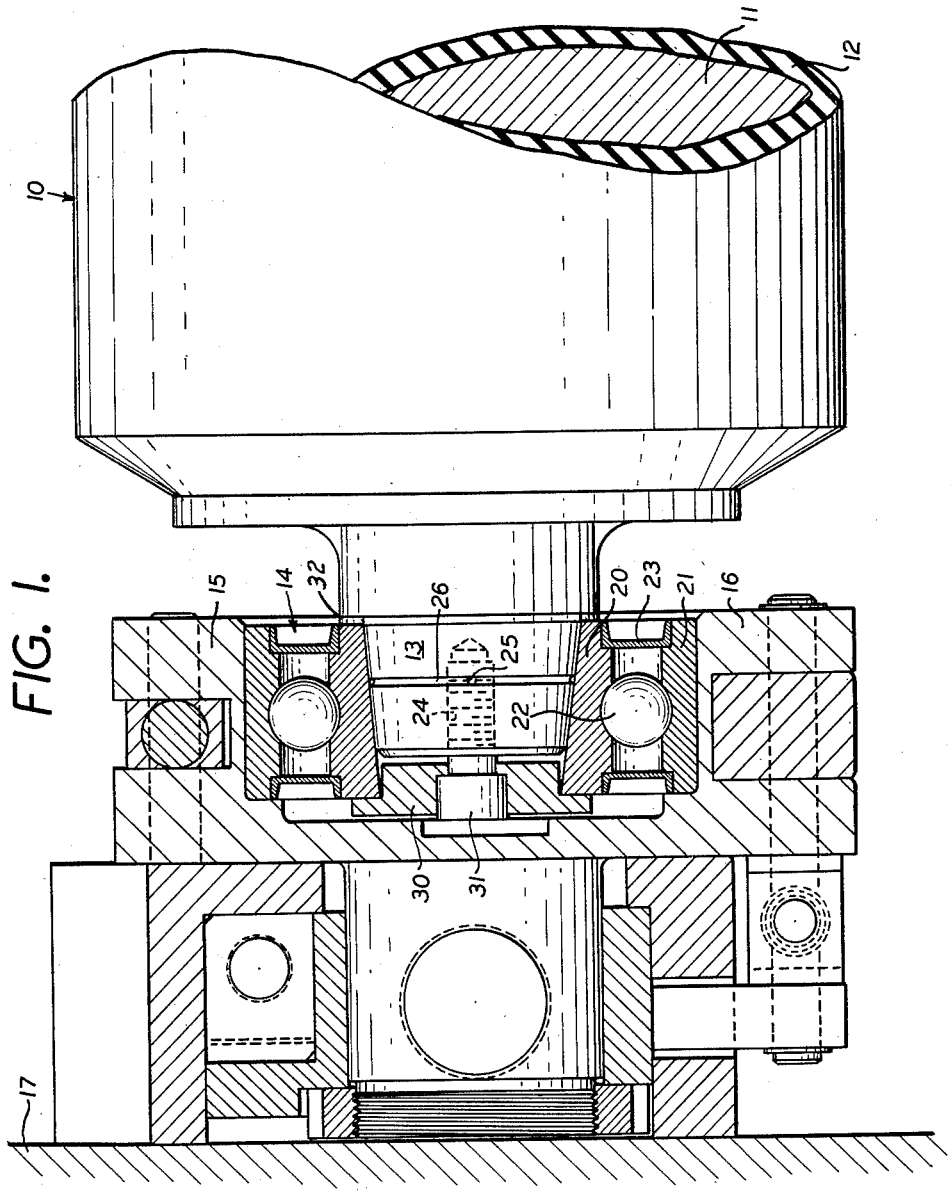
Figure 2:
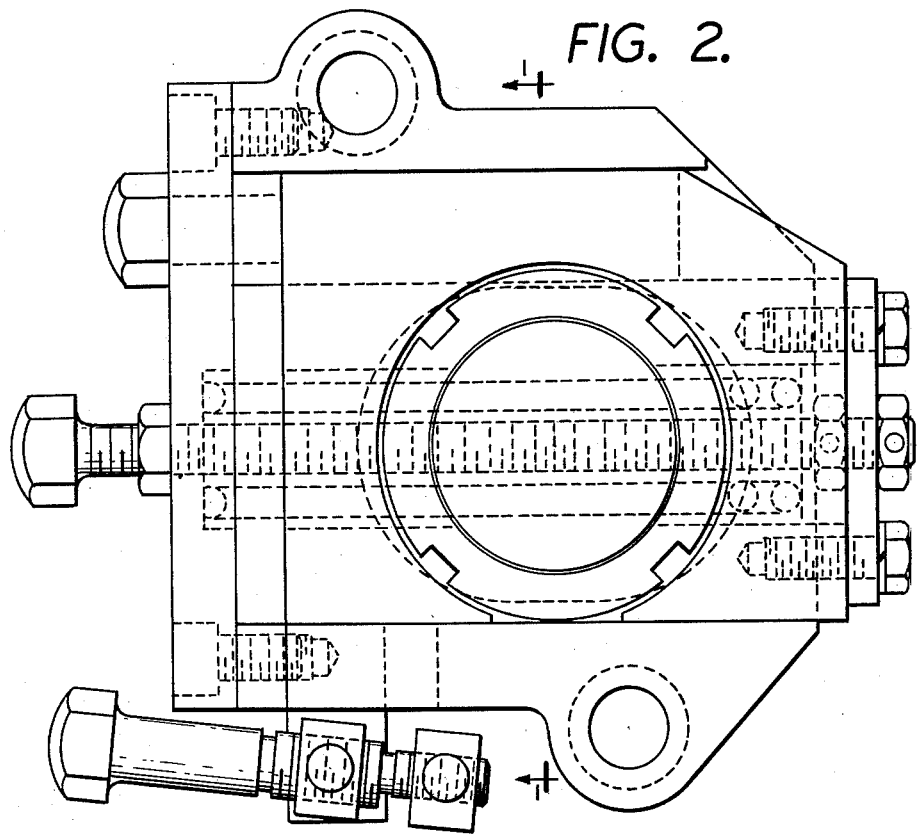
Figure 3:
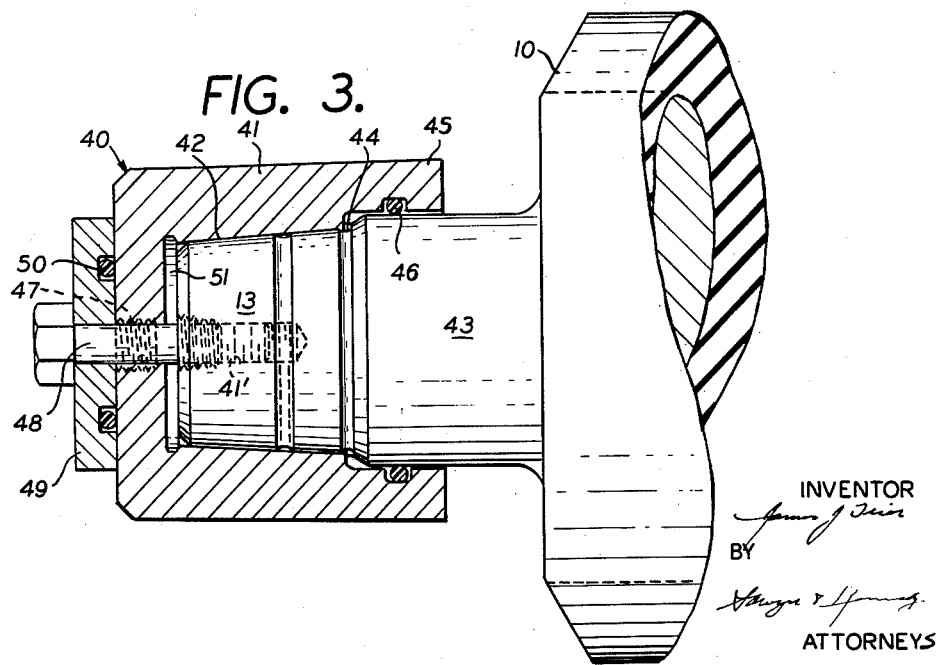

In the drawing:
FIG. 1 is a view in axial section on the line 1—1 of FIG. 2 of a roller and supporting socket embodying the invention in a preferred form;
FIG. 2 is an end elevation of the roller and socket of FIG. 1;
FIG. 3 is a section showing the roller removed from its sockets and bearings and with a grinding adapter attached thereto.

Referring to the drawings, there is shown at 10 a resilient surfaced roller having a hard steel or similar core 11 and outer covering 12, typically of petroleum resistant synthetic rubber, the roller having a reduced tapered journal 13 mounted in an anti-friction bearing 14 which, in turn, is removably carried in the jaws 15 and 16 of a roller socket or mounting element which is attached to the press frame 17. This roller socket may be of the construction shown in Harless Patent No. 2,861,-516, or in other convenient form. The present invention is not concerned with the details of this element.

The bearing 14 has inner and outer races 20, 21 between which are the balls 22 and is preferably permanently lubricated and provided with annular sealing plates 23 in the well known manner. The inner race and journal 13 are correspondingly tapered, a taper of 1 to 12 or thereabouts being suitable and the bearing is force or interference fitted to the journal by means of hydraulic pressure applied through a grease gun or similar element screwed into the threaded central bore 24 which communicates through a radial channel or channels 25 with the circumferential groove 26 in the surface of the journal 13. Application of hydraulic pressure permits the expansion of the inner race 20 of the bearing in the manner described in prior Harless Patent No. 2,840,399 and in Australian Patent 121,014 cited therein, and the assembly is completed by an end cap 30 held in place by a bolt 31. The extent to which the bearing is forced onto the journal may be limited by a washer 32 if desired or may be controlled by the pressure applied and consequent predetermined expansion of the bearing. The bearings having been applied to the roller in the manner indicated, the bearings are placed in the open jaws of the socket 15 and these elements are clamped together as shown in FIG. 2, the socket mounting itself providing for the necessary movement of the roller with relation to cooperating elements to obtain the required engagement and to accommodate or adjust for changes in diameter of the roller.

When the roller requires resurfacing, it and its bearing are removed from the machine and the bearings are removed from the journals 13, by expanding the bearings hydraulically in the manner indicated. Adapters shown in FIG. 3 are then placed upon the roller journals. The adapter 40 has an accurately ground outer cylindrical surface 41 and tapered inner surface 42, which surfaces are concentric. The tapered surface 42 has the same taper as the journal 13 and fits around the same as shown in FIG. 3. The inner end of the adapter is enlarged and fits around the enlarged hub portion 43 of the roller. Means, such as washer 44, may be provided for limiting the movement of the adapter onto the journal. The inner end or skirt 45 of the adapter fits around the hub 43 with clearance as shown but contains an O-ring or resilient element which is preferably of material such as a silicone compound capable of withstanding steam of 290° F. and 43 pounds per square inch pressure so as to insure against deterioration in the grinding operation. The ring 46 seals the journal 13 against steam, water and grinding detritus which tend to work their way into the journals and rollers while in the grinding machine. At the same time, the accurately concentric outer surface 41 provides for mounting the rollers in machines of present design in a truly concentric and convenient manner. The outer end of the fitting 41 comprises a tapered threaded bore 47 adapted to receive a grease gun or similar hydraulic pressure device and also accommodating bolt 48 which engages in the threaded central bore 41 of the journal 13 for holding an end plate 49 in position. End plate 49 has a groove containing an O-ring 50 similar to the ring 46 previously described and furnishing a seal at this point. Ordinarily the metal to metal engagement of the head of bolt 48 with plate 49 is sufficient to seal at this point permitting the application of direct bolt pressure without the necessity of compressing a gasket. The adapter is dimensioned so as to be attachable without hydraulic expansion and by merely drawing up tightly on the bolt 48. Since the fitting 40 may tend to freeze in place during use, hydraulic pressure may be required to remove this and this is readily done by removing the bolt 48 and plate 49, inserting a grease gun in the bore 47 and pumping the required pressure within the end space 51 between the end of the adapter and the end of the journal 13. As the outer surfaces 41 of the adapters may become worn, they are readily refinished and replaced when refinishing is not practical.

What is claimed is:

1. A grinding adapter for printing machine soft surfaced rollers comprising a generally cup-shaped member having a cylindrical outer surface, a concentric tapered inner bore and a concentric countersunk cylindrical inner bore at the larger end of the tapered inner bore, for fitting respectively, over the tapered end and adjacent cylindrical portion of a roller shaft, the said countersunk cylindrical bore having a groove containing an O-ring for sealing the roller shaft, the end of the adapter having a central bore for accommodating a screw for positioning the adapter on a roller shaft end.

2. An adapter according to claim 1, comprising also a washer plate for transmitting pressure from the said screw head to the adapter, a face of the washer plate engaging the adapter and the said face having a groove, and an O-ring accommodated in the last said groove for sealing the washer plate to the adapter.

References Cited in the file of this patent

UNITED STATES PATENTS 2,646,297   Crichton et al. _____ July 21, 1953